US 8,223,774 B2

(12) United States Patent
Taylor (10) Patent No.: US 8,223,774 B2
(45) Date of Patent: Jul. 17, 2012

(54) CELLULAR DSL MODEM (75) Inventor: Jeffery Lynn Taylor, Rushville, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 359 days.

(21) Appl. No.: 12/312,878

(22) PCT Filed: Dec. 5, 2006

(86) PCT No.: PCT/US2006/046289
§ 371 (c)(1),
(2), (4) Date: May 29, 2009

(87) PCT Pub. No.: WO2008/069786
PCT Pub. Date: Jun. 12, 2008

(65) Prior Publication Data
US 2010/0054197 A1    Mar. 4, 2010

(51) Int. Cl.
*H04L 12/28* (2006.01)
(52) U.S. Cl. ............... 370/395.6; 370/208; 370/395.52; 370/466; 370/474; 370/476
(58) Field of Classification Search ............ 370/395.52, 370/395.6, 395.64, 464–468, 476, 208, 474
See application file for complete search history.

(56) References Cited

U.S. PATENT DOCUMENTS

| 5,867,485 | A | 2/1999 | Chambers et al. | |
|---|---|---|---|---|
| 6,163,537 | A | 12/2000 | Thacker | |
| 6,324,379 | B1 | 11/2001 | Hadden et al. | |
| 6,782,240 | B1 | 8/2004 | Tabe | |
| 2002/0080821 | A1 | 6/2002 | Hwang | |
| 2002/0159457 | A1* | 10/2002 | Zhang et al. | 370/391 |
| 2003/0002538 | A1* | 1/2003 | Chen | 370/503 |
| 2003/0016770 | A1 | 1/2003 | Trans | |
| 2003/0081622 | A1 | 5/2003 | Jeong | |
| 2004/0111753 | A1 | 6/2004 | Hoang | |
| 2004/0213252 | A1* | 10/2004 | Lee et al. | 370/395.1 |
| 2005/0201406 | A1 | 9/2005 | Sekine et al. | |

FOREIGN PATENT DOCUMENTS

| EP | 1018742 | 4/2002 |
|---|---|---|
| GB | 2406238 | 3/2005 |
| JP | 2005-244601 | 9/2005 |
| KR | 2003-0045904 | 6/2003 |
| WO | 9748196 | 12/1997 |
| WO | 0042512 | 7/2000 |
| WO | 0152452 | 7/2001 |

OTHER PUBLICATIONS

S. Hara, Power amplifier MMIC for 5 GHz wireless LAN, Sharp Technical Journal, vol. 84, pp. 67-70, 2002.
Nikolaos Fougias, High Speed Network Access to the Last-Mile Using Fixed Broadband Wireless, Naval Postgraduate School, Monteray, CA, Master's thesis, 119 pgs.

(Continued)

*Primary Examiner* — Christopher Grey
(74) *Attorney, Agent, or Firm* — Robert D. Shedd; Robert B. Levy; Jeffrey D. Hale (57) ABSTRACT An apparatus includes an converter for changing network data into asynchronous transfer mode data for cellular transmission as a digital subscriber line signal, and for reconstructing network data from a cellular reception of a digital subscriber line signal.

12 Claims, 3 Drawing Sheets

OTHER PUBLICATIONS

F.N. Pavlidou, ICT '98. "Performance Evaluation of RS-Coded DS/CDMA with M-ary Orthogonal Signaling and Errors/Erasures Decoding",International Conference on Telecommunications. Bridging East and West Through Telecommunications, The IEE, vol. 1, 4 vol. (pp. 522+459+522+513), 1999.

Anon., Satellite in-orbit group delay measurement using a microwave system analyzer, Microwave J, vol. 48, No. 3, pp. 146-150, 2005.

Maury Wright, I Will Follow: Wireless broadband tags along from office to road, commVerge, vol. 3, No. 1, p. 15(1), 2002.

Daniel A. Pitt, Residential communications. (establishing a communications infrastructure to bring the Internet to homes) (Internet/Web/Online Service Information), Hewlett-Packard Journal, vol. 48, No. 5, p. 11(8), 1997.

6th International Conference on Telecommunications in Modern Satellite, Cable and Broadcasting Services, The IEE, vol. 1, pp. 2 vol. xv+841, 2003.

Bill Weaver, Modulation Adulation: High-speed wireless data transmission . . . , Scientific Computing & Instrumentation, vol. 20, No. 6, p. 12(2), 1999.

Paolella, et al., Dense wavelength division multiplexing photonic transport for radio frequency and microwave services, Proceedings of the SPIE—The International Society for Optical Engineering, vol. 5595, No. 1, pp. 185-193, 2004.

Deborgies, et al., Progress in the ACTS FRANS project, International Topical Meeting on Microwave Photonics. MWP '99. Technical Digest, vol. 1, pp. 115-118, 1999.

Capmany, et al., Microwave photonic signal processing for wireless systems and optical internet: Overview of the current achievements of the IST-labels project, Proc. Int. Conf. Transparent Opt. Netw., vol. 2, pp. 8-12, 2004.

Arney, et al., Enabling MEMS technologies for communications systems, Proc. SPIE Int. Soc. Opt. Eng., vol. 4592, pp. 257-266, 2001.

A.K. Alhakeem, Mymar, a new mobile yellow page messaging and retrieval, the advent of the local wireless Internet, 2000 Canadian Conference on Electrical and Computer Engineering, vol. 2, pp. 1014-1017, 2000.

Graca, et al., Upgrade to the control system of the reflectometry diagnostic of ASDEX upgrade, Rev. Sci. Instrum., vol. 75, No. 10 11, pp. 3852-3854, 2004.

Search Report Dated Jul. 30, 2007.

* cited by examiner

CELLULAR DSL MODEM

This application claims the benefit, under 35 U.S.C. §365 of International Application PCT/US2006/046289, filed Dec. 5, 2006, which was published in accordance with PCT Article 21(2) on Jun. 12, 2008 in English.

TECHNICAL FIELD

The present principles generally relate to wireless broadband communications, and, more particularly, to a system and method for transmitting a DSL signal over a cellular telephone network.

BACKGROUND

Recently, broadband digital communications have become widespread in most metropolitan areas of the United States. One of the available broadband technologies is Digital Subscriber Lines (DSL). DSL typically operates on existing telephone landlines, transmitting a signal over copper wire. DSL achieves data transfer by transmitting data in frequencies higher than those frequencies normally heard by human ears.

However, the greatest limitation of DSL is the power loss associated with the electrical resistance of copper wire over even average distances. Therefore, consumers who desire DSL service must usually reside within approximately 3 miles of a DSL provider's central office. For consumers residing in less densely populated areas, particularly in rural areas, the distance requirements of DSL prohibit the provision of DSL lines.

Satellite broadband service has recently been used to fill the gap in broadband service to outlying areas. The largest drawback to satellite broadband service is the delay (or "lag") when requesting and receiving data, especially Internet data.

Additionally, current wireless techniques are generally unsuitable for the longer transmission ranges needed in rural areas. The WiFi/WiMax standards, such as 802.11a/b/g tend to give an acceptable data throughput, but are severely range limited. Generally, the 802.11a/b/g tend to have an effective range in the hundreds of yards. Using boosted signals and specialized equipment, WiFi and WiMax signals can be transmitted close to 50 miles, but the degradation in quality, difficulty of setup and maintenance, and questions regarding FCC compliance make acceptable long range transmission of WiFi and WiMax signals impractical.

What is needed is a system and method for transmitting broadband data from remote areas with little or no user setup needed. Preferably, this system will transmit wirelessly, and make use of existing infrastructure to reduce the initial outlays associated with delivering rural broadband service.

SUMMARY

The present principles are directed to wireless transmission of data over a cellular network.

According to one aspect of the present principles, there is provided a converter for changing network data into asynchronous transfer mode (ATM) data for cellular transmission as a digital subscriber line signal, and for reconstructing network data from a cellular reception of digital subscriber line signal.

According to another aspect of the present principles, there is provided a method that includes changing network data into asynchronous transfer mode (ATM) data for cellular transmission as a digital subscriber line signal, and reconstructing network data from a cellular reception of digital subscriber line signal.

According to another aspect of the present principles, there is provided an apparatus that includes a frame controller configured to receive a plurality of input signals, a fast signal buffer configured to receive a signal from the frame control module, an interleaved signal buffer configured to receive a signal from the frame control module and configured to interleave a cyclic redundancy check byte into the signal, and a coded orthogonal frequency division multiplexing encoder configured to receive a signal from the fast signal buffer and a signal from the interleaved signal buffer, the COFDM encoder configured to encode and multiplex the signals for wireless transmission at a variable transmission rate.

According to another aspect of the present principles, there is provided an apparatus that includes an amplifier for amplifying a signal received from the cellular antenna module, an analog-to-digital converter and filter module converting the signal from an analog signal to a digital signal receiving a signal from the amplifier, a cyclic redundancy check (CRC) prefix stripping module for stripping a CRC prefix signal receiving a signal from the ADC and filter module, a discrete Fourier transform (DFT) module for performing a DFT on a signal receiving a signal from the CRC prefix stripping module, a fair distributed queue (FDQ) module for performing a FDQ traffic shaping receiving a signal from the DFT module, a coded orthogonal frequency division multiplexer (COFDM) decoder for demultiplexing and decoding a signal receiving a signal from the FDQ module, a fast signal buffer receiving a signal from the COFDM decoder, an interleaved signal buffer receiving a signal from the COFDM decoder, and a frame control module electrically for reassembling the frame data into ATM data receiving a signal from the fast signal buffer and receiving a signal from the interleaved signal buffer, the frame control module have a plurality of outputs.

The transmitter may also optionally include the fast signal buffer comprising a CRC module for performing a CRC check on the signal receiving a signal from the frame controller, a scrambler for scrambling the signal receiving a signal from to the CRC module, and an encoding module for encoding the signal, receiving a signal from the scrambler module and transmitting the signal to the COFDM encoder module. Additionally, the transmitter may optionally further include the interleaved signal buffer comprising a CRC module for performing a CRC check on the signal electrically receiving a signal from the frame control module, a scrambler module for scrambling the signal receiving a signal from to the CRC module, an encoder configured to receive a signal from the scrambler and encoding the signal, an interleaving module for interleaving at least one CRC check byte into the signal receiving a signal from encoding module and transmitting the signal to the COFDM encoder.

BRIEF DESCRIPTION OF THE DRAWINGS

The advantages, nature, and various additional features of the present principles will appear more fully upon consideration of the illustrative embodiments now to be described in detail in connection with accompanying drawings wherein.

It should be understood that the drawings are for purposes of illustrating the concepts of the present principles and are not necessarily the only possible configuration for illustrating the present principles.

DETAILED DESCRIPTION OF THE INVENTION

Accordingly, the present principles provide a system for transmitting data over a cellular digital subscriber line (DSL) modem. A cellular DSL modem capable of transmitting and receiving asynchronous transfer mode (ATM) data over an existing wireless network is presented. The modem makes use of coded orthogonal frequency division multiplexing (COFDM) encoding and decoding to transmit and receive large volumes of data over multiple data channels on a wireless cellular network. The use of a wireless cellular network allows data transmissions over greater distances without the need for additional infrastructure. Additionally, a CODFM encoder/decoder in a transmitter/receiver, or other module in the transmitter/receiver may negotiate a variable rate transmission to advantageously compensate for any interference and data loss, or equipment and network requirements. Variable rate transmissions also allow service providers to allocate a larger percentage of a particular user's available bandwidth to the most heavily utilized transmission direction, which is generally sending data from the service provider to the user. A COFDM encoder module may further permit the transmission of an ATM signal over an existing cellular network by inserting pilot tones into a COFDM data signal to provide a baseline for correcting interference and frequency drift errors in the data channels.

It is to be understood that the present principles are described in terms of a cellular DSL modem; however, the present principles are much broader and may include any wireless data transmission system. In addition, the present principles are applicable to any data transmission system used by a computer, telephone, set top box, satellite link, etc. The present principles are described in terms of a cellular DSL modem; however, the concepts of the present principles may be extended to other broadband data transmission services.

It should be understood that the elements shown in the Figs. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative modules embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor or element, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches, buttons or decision blocks shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Figure 1:
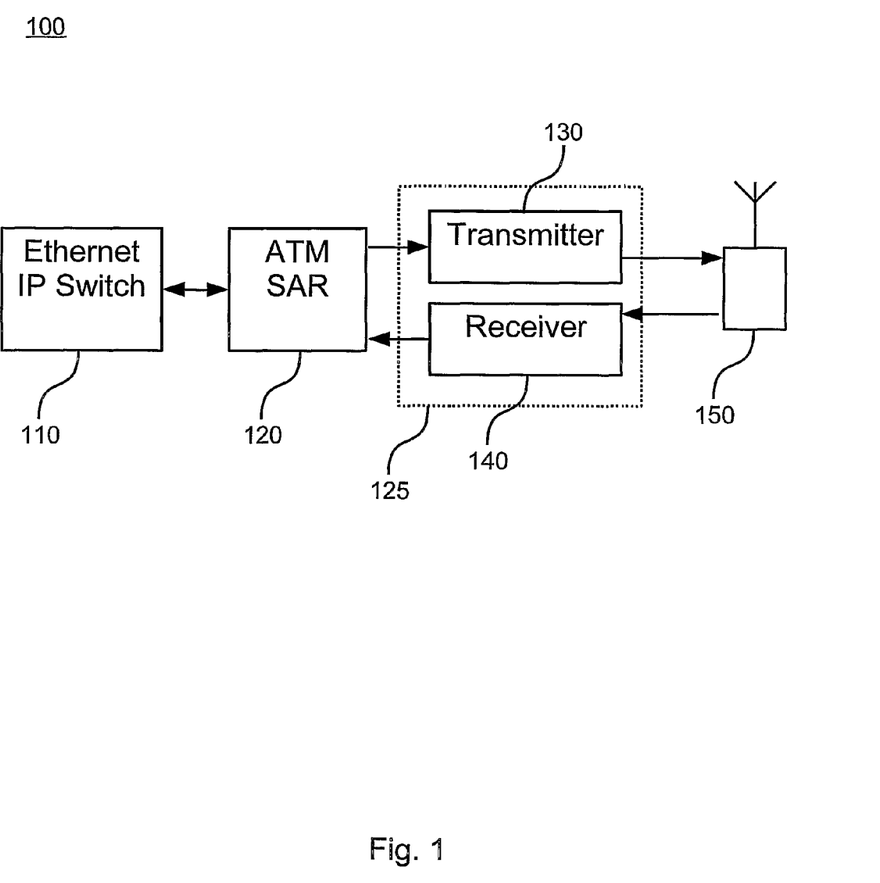
FIG. 1 is a block diagram of an illustrative embodiment of a cellular DSL modem in accordance with the present principles.

Referring now in specific detail to the drawings in which like reference numerals identify similar or identical elements throughout the several views, and initially to FIG. 1, a block diagram of an illustrative embodiment of a cellular DSL modem 100 (hereinafter, the modem) in accordance with the present principles is depicted Initially, the modem 100 is comprised of a digital network communications module 110, such as an Ethernet Internet Protocol (IP) switch module integrated circuit (IC) module 110. This switch 110 may be electrically connected to an asynchronous transfer mode (ATM) segmentation and reassembly (SAR) module (120). The Ethernet IP switch module 110 routes and manages data to and from a plurality of Ethernet ports, which may be connected to a local area network (LAN) router, hub, PC or the like.

The data processed by the Ethernet switch module 110 is sent and received from the ATM SAR 120. The ATM SAR 120 handles the transmission and reception of data in the form of frames. In general, frames may be digital data transmissions, where part of the frame includes information regarding the organization and transport of the frame itself, and part of the frame may be the data payload. In a particularly useful embodiment, the ATM SAR may be configured to handle frames in the form of Internet Protocol (IP) packets and ATM cells. The modem may also include a transceiver 125, which may optionally be comprised of a transmitter module 130 and a receiver module 140.

The ATM SAR 120 also encodes data into fixed sized cells prior to transmission to the transmitter module 130, and subsequent transmission over a wireless antenna module 150. In one useful embodiment, the wireless antenna module 150 may be a cellular antenna module. Likewise, the ATM SAR 120 may receive ATM formatted data from the receiver 140, and reassemble the data into a format suitable for transmission to the Ethernet IP switch 110.

Frequently, data communicated over an IP network is composed of packets that are generally 522 or 1500 bytes long. Conversely, the data payloads of ATM cells are commonly 48 bytes long, and include an additional 5 byte header. In one useful embodiment, the ATM SAR segments an individual IP packet into a plurality of 48 byte cells and pads the last ATM cell to 48 bytes. While 48 bytes ATM data payloads are common in DSL transmissions, any length data payload may be advantageously used in accordance with the present principles. In another useful embodiment, the ATM SAR may receive multiple ATM cells, which are reassembled into an IP packet which is transmitted to the Ethernet IP switch.

The transmitter module 130 is electrically connected to the ATM SAR 120, and a wireless antenna module 150. The transmitter module 130 receives a signal from the ATM SAR module 120, interleaves and encodes the signal for transmission, and transmits the interleaved, encoded signal through the wireless antenna module 150. Likewise, the receiver module 140 is electrically connected to the ATM SAR module 120, and the wireless antenna module 150, receiving a signal through the wireless antenna module 150, demodulating, decoding and deinterleaving the received signal, and transmitting the signal to the ATM SAR module 120.

Figure 2:
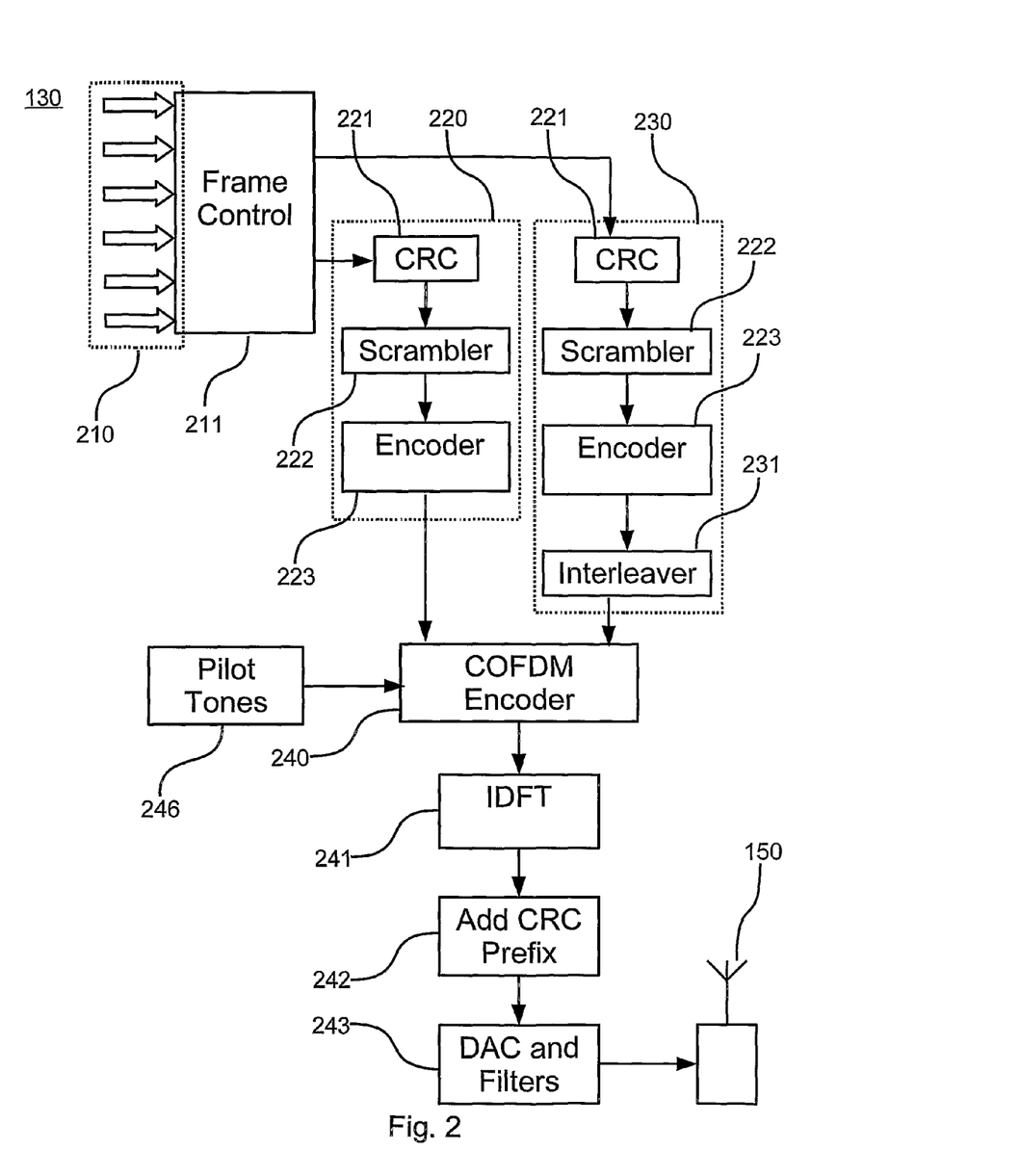
FIG. 2 is block diagram of an illustrative embodiment of the cellular DSL modem transmitter in accordance with the present principles.

Referring to FIG. 2, a block diagram of an illustrative embodiment of the cellular DSL modem transmitter module 130, in accordance with the present principles, is depicted.

Initially, various data inputs 210 are transmitted to the frame control 211. In one preferred embodiment, the data inputs may be data signals such as, but not limited to, the ATM cell data received from the ATM SAR 120, embedded operations channel (EOC) data, synchronization data, ADSL overhead control (AOC) channel data or indicator bit information. The frame control module 211, may perform such data processing as synchronizing and creating data frames suitable for further processing and transmission, and multiplexing data into a fast data buffer 220 and an interleaved data buffer 230.

In a fast data buffer 220, the signal being processed is not interleaved, eliminating the overhead and subsequent delay associated with the interleaving. Initially, a cyclic redundancy check (CRC) is performed by the CRC module 221 to ensure that the data coming from the frame control 211 has not become corrupted, and to provide a baseline for later error checking. A scrambler unit 222 scrambles the signal. In one preferred embodiment, the scrambling may occur to eliminate repetitious data patterns, which may introduce errors during transmission, and to randomize the data stream. Such randomized data streams assist in the reduction of interference between multiple signals. Furthermore, such methods of scrambling are well known to skilled artisans.

In the fast data buffer 220, the scrambled signal is encoded by the encoder module 223. In one particularly useful embodiment, the encoding module 223 may perform Reed-Solomon encoding. Reed Solomon encoding advantageously applies forward error correction (FEC) to the scrambled data to assist in reducing errors. Alternatively, another useful embodiment may use any other FEC or encoding, the advantages of which will be apparent to those skilled in the art. The fast data buffer 220 is electrically connected to the coded orthogonal frequency division multiplexing (COFDM) encoder module 240. The modem 100 makes use of coded orthogonal frequency division multiplexing (COFDM) encoding and decoding to transmit and receive large volumes of data over multiple data channels on a wireless cellular network. The use of a wireless cellular network allows data transmissions over greater distances without the need for additional infrastructure.

Similar to the fast data buffer 220, the interleaved data buffer 230 performs a CRC check in a CRC module 221, scrambling in a scrambler module 222, and encoding in an encoder module 223. In the interleaved data buffer 230, the encoding module 223 is electrically connected to the interleaver module 231. The interleaver module 231 may interleave check bytes from the encoder module 223 into the data signal to reduce the effects of any interference. By interleaving the check bytes, any interference will affect the check bytes as well as the data, advantageously reducing the number of data bits affected by an instantaneous or impulse interference. The interleaver module 231 of the interleaved data buffer 230 is electrically connected to the COFDM encoder module 240. The COFDM encoding module 240 codes and divides data signals from the fast data buffer 220 and the interleaved data buffer 230 for transmission over a wireless link. The COFDM methodology is well known to skilled artisans.

However, in brief, the COFDM encoding process divides a signal into multiple data signals, which are transmitted in different frequencies, referred to as channels or data channels. In standard cellular communications, the COFDM encoder module 240 may also be responsible for managing the data frames of a cellular communication. Additionally, multiple incoming data signals are coded from a binary signal into a numerically complex and orthogonal signal, allowing multiple signals to be orthogonal to each other, reducing interference and channel cross talk. The different data channels on different frequencies may combined into a single, output data channel for transmission over a single transmission medium, such as a wireless link. In one preferred embodiment, the COFDM encoding module 240 encodes the signals from the fast data buffer 220 and interleaved data buffer 230 in such a way as to communicate with an existing cellular phone system.

Frequently, DSL data is communicated at an asynchronous rate, that is, where the upload data transmission rate differs from the download data transmission rate. A higher download transmission rate is commonly used to send web pages and other requested data to end users more rapidly, while a lower upload data transmission rate is used to transfer files from an end user to the service provider. This asynchronous data transfer rate allows service providers to dedicate more bandwidth to providing greater data download capabilities to end users while maximizing the usage of available bandwidth.

A CODFM encoder/decoder in a transmitter/receiver, or other module in the transmitter/receiver may negotiate a variable transmission rate, and transmit/receive data at a variable rate, to advantageously compensate for any interference and data loss, or equipment and network requirements. Variable rate transmissions also allow service providers to allocate a larger percentage of a particular user's available bandwidth to the most heavily utilized transmission direction. Generally, this includes sending data from the service provider to the user. It is well known to skilled artisans that the transmission speed negotiation, or "handshake", allows the equipment at both ends of a digital transmission to communicate and agree on a speed that all of the equipment can handle with an acceptable amount of data corruption. It is further known to skilled artisans that line condition, interference, carrier frequency, equipment condition, data traffic and the like are all factors contributing to the data loss and corruption that may occur during a digital data communication. The speed of communication may be dependent on these factors, or other network or service provider related preferences and limiting factors.

In one preferred embodiment, the COFDM encoder module 240 may be configured to take advantage of the asynchronous nature of DSL communications. In particular, the COFDM encoder module 240 may be configured to modify the data upload transmission speed, and to negotiate and manage the data transmission handshake upon connection to a cellular network.

In one preferred embodiment, the transmitter module 130 or COFDM encoding module 240 may negotiate the transmission rate upon establishing communications with the head end service provider equipment. However, in another useful embodiment, the transmitter module 130 or COFDM encoding module 240 may establish a connection and vary the transmission rate during the transmission to compensate for variable interference and the like.

A COFDM encoder module 240 may further permit the transmission of an ATM signal over an existing cellular network by inserting pilot tones 246 into a COFDM data signal to provide a baseline for correcting interference and frequency drift errors in the data channels. Standard DSL protocols frequently use pilot tones 246, or tones that are not data modulated to resolve sample timing. Generally, standard COFDM transmissions do not include pilot tones, but such tones may be advantageous in a cellular DSL transmission. Skilled artisans will recognize that two pilot tones 246 are commonly used as references during the DSL communications process, but that any number of pilot tones 246 may be advantageously used. A transmission using pilot tones 246 may be received at a location, and the pilot tones 246 compared to other channels to estimate the frequency drift of carrier frequencies at the transmitter, the error and interference of the data channels and the like. The pilot tones 246 are transmitted on known frequencies, and, therefore, offer a baseline for comparison. Such comparisons allow the receiving equipment to correct data channels based on the comparison of the data channels to the known pilot tone 246 frequencies.

In yet another useful embodiment, the COFDM encoder 240 may add pilot tones 246 to the outgoing data when performing the COFDM functions on the ATM cell data. Preferably, the pilot tones 246 may be on channels 16 and 64, but may be advantageously transmitted on any data channels while adhering to the spirit of the present principles.

An inverse discrete Fourier transform (IDFT) module 241 is electrically connected to the COFDM encoder 240. The IDFT module 241 performs an inverse discrete Fourier transform on the total signal received from the COFDM encoder 241, which is known to artisans skilled in the COFDM art. The inverse discrete Fourier transform may be advantageously applied as a fast Fourier transform (FFT), to convert a plurality of frequency domain signals into a time domain signal.

A CRC prefix addition module 242 is electrically connected to the IDFT module 241, and adds a CRC prefix to each frame as it is transmitted. The CRC prefix addition module 242 is electrically connected a Digital-to-Analog converter (DAC) and filter module (243). The DAC and filter module (243) may prepare a signal for transmission on any kind of wireless system, converting the digital signal that was processed in the transmitter 130 to a signal capable of being transmitted over a wireless link, and shaping and filtering the analog signal for the best performance on the service provider's equipment.

The DAC and filter module 243 is electrically connected to a wireless antenna module 150. The wireless antenna module 150, particularly when in the form of a cellular antenna module, may be comprised of elements well known to skilled artisans, such as a physical antenna, traffic handling elements, amplifier and the like.

Figure 3:
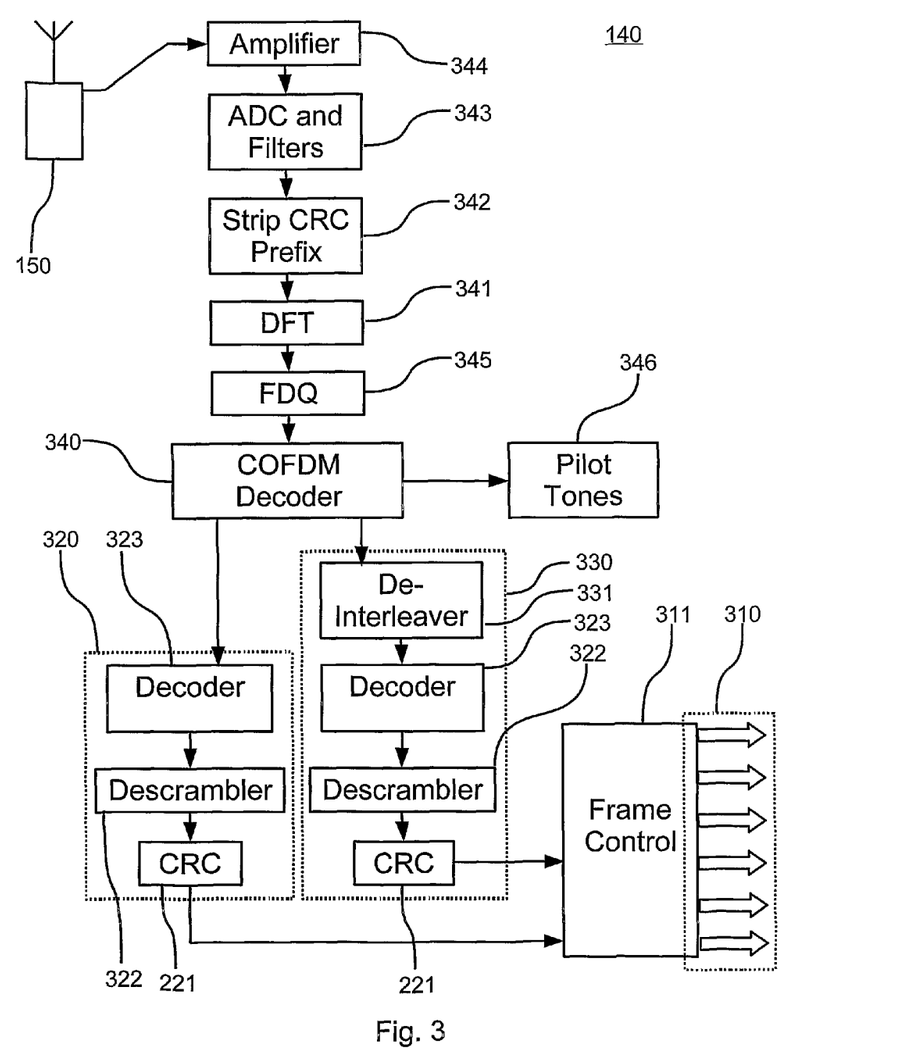
FIG. 3 is block diagram of an illustrative embodiment of the cellular DSL modem receiver in accordance with the present principles.

Referring now to FIG. 3, a block diagram of an illustrative embodiment of the cellular DSL modem receiver module 140, in accordance with the present principles, is depicted.

Initially, a wireless signal is received at the receiver module 140 by a wireless antenna module 150. In one particularly useful embodiment, the wireless antenna module is a cellular antenna module capable of transmitting and receiving a cellular telephone signal. Skilled artisans will recognize that such a cellular antenna module may be comprised of elements necessary for the proper reception and handling of cellular signals, such as a physical antenna, cellular network protocol handling elements and the like.

The wireless antenna module 150 is electrically connected to an amplifier module 344, which may boost the received signal. The amplifier module 344 is electrically connected to the analog-to-digital converter (ADC) and filter module 343. The ADC 343 may convert the transmitted wireless analog signal into a digital form that may be processed by later elements in the receiver 140. Additionally, the ADC and filter module 343 may filter the signal to remove noise picked up during the transmission, to improve or eliminate certain frequencies, or any other filtering known to skilled artisans. Additionally, some or all of the filtering may occur prior to the analog-to-digital conversion, and some or all of the filtering may occur after the conversion.

The ADC and filter module 343 is electrically connected to the CRC prefix stripping module 342. This module may strip any CRC prefixes appended to each frame, adjusting any frames as necessary. A discrete Fourier transform (DFT) module 341 is electrically connected to the receiver 140. This DFT module 341 may apply a fast Fourier transform (FFT) to the incoming signal to convert the time-domain based signal into a frequency domain based collection of signals. A fair distributed queue (FDQ) module 345 is electrically connected to the DFT module 341. In one preferred embodiment, the FDQ module 345 may employ the fair distributed queue protocol on the signal to allocate bandwidth to certain frequencies and channels, shaping the traffic patterns to account for frequencies and channels with more noise or delay. In another useful embodiment, the distribution queuing may take the form of a distributed queue dual bus (DQDB) distribution scheme, or any other load and traffic balancing scheme known or as yet undiscovered.

The FDQ module 345 is electrically connected to a coded orthogonal frequency division multiplexing (CODFM) decoder module 340. The COFDM decoder module 340 reassembles the multiple frequency channels associated with the DFT module 341, and decodes the signals encoded by an encoder such as the COFDM encoder 240. Similar in concept to the pilot tones 246 transmission by the COFDM encoder module 240, one useful embodiment of the COFDM decoder module 340 may accept a signal having pilot tones 346. These pilot tones 346 may be used to calculate or estimate frequency drift rate, data corruption, interference, and the like for the data channels transmitted concurrently with the pilot tones 346. In a particularly useful embodiment, the COFDM encoder module 240 may also be configured to negotiate or accept cellular frame transmission at varying transmission rates.

The COFDM decoder module 340 may also advantageously split the signal into an interleaved signal and a fast signal. The COFDM decoder module 340 may be electrically connected to a fast signal buffer 320, to which the COFDM decoder module 340 transmits the fast signal. Additionally, the COFDM decoder module 340 may also be electrically connected to the interleaved signal buffer 330, to which the COFDM decoder module 340 transmits the interleaved signal. Additionally, the receiver module, or the COFDM decoder module may negotiate a variable data reception rate with the service provider head end equipment, and receive data at a variable transmission rate.

The fast signal buffer 320 may include a decoder module 323. In one particularly useful embodiment, the fast signal is encoded using Reed-Solomon encoding, having FEC and a plurality of check bytes. In this embodiment, the decoder module 323 may decode the signal, removing any check bytes and FEC, resulting in a decoded signal.

Additionally, the fast signal buffer 320 may also be comprised of a descrambler module 322 electrically connected to the decoder module 323 and a CRC module 221. The descrambler module 322 removes the scrambling done during the transmission process, and the CRC module verifies that the frame being checked has been transmitted and decoded properly.

An interleaved symbol buffer 330 may include a deinterleaving module 331 which removes the interleaved check bytes, resulting in a non-interleaved signal. The interleaved signal buffer 330 may also be comprised of a decoder module 323 electrically connected to the deinterleaving module 331 and a descrambler module 322, where the descrambler module may be electrically connected to a CRC module 221. The decoder module 232, descrambler module 322 and CRC module 221 of the interleaved signal buffer 330 operates on the signal in the same manner as their respective counterparts in the fast signal buffer 320.

The receiver module may also be comprised of a frame control module, 311, which is electrically connected to the CRC modules 221 of the fast signal buffer 320 and the interleaved signal buffer 330. The frame control module 311 may demultiplex the signals from the fast signal buffer 320 and the interleaved signal buffer 330, and reassemble the frames into signals suitable for transmission to the plurality of outputs 310. The plurality of outputs may mirror the inputs 210 of the transmitter 130, such as embedded operations channel (EOC) data, synchronization data, ADSL overhead control (AOC) channel data, indicator bit information and the like.

Having described preferred embodiments for system and method for a cellular DSL modem (which are intended to be illustrative and not limiting), it is noted that modifications and variations can be made by persons skilled in the art in light of the above teachings. It is therefore to be understood that changes may be made in the particular embodiments of the present principles disclosed which are within the scope and spirit of the present principles as outlined by the appended claims. Having thus described the present principles with the details and particularity required by the patent laws, what is claimed and desired protected by Letters Patent is set forth in the appended claims.

The invention claimed is:

1. An apparatus comprising:
    a converter for changing network data into asynchronous transfer mode (ATM) data for cellular transmission as a digital subscriber line signal and for reconstructing network data from a cellular reception of a digital subscriber line signal; and
    a transceiver for transmitting the asynchronous transfer data from the converter as the digital subscriber line signal and receiving data from the cellular network for reconstruction into network data by the converter,
    wherein the converter includes an asynchronous transfer mode segmentation and reassembly (ATM SAR) module for segmenting and reassembling data frames and for bidirectionally communicating a digital signal between a packet network and an ATM network; and the transceiver is a transmitter for processing and transmitting the data signal, and for receiving at least one signal from the ATM SAR module, the transmitter being configured for transmitting ATM cells at a variable rate, the transmitter module having a coded orthogonal frequency division multiplexing (COFDM) encoder module for encoding and multiplexing at least one ATM cell on a plurality of data channels.

2. The apparatus of claim 1, wherein the ATM SAR module is configured to receive Internet Protocol (IP) packets and segment the IP packets into ATM cells.

3. The apparatus of claim 1, wherein the transmitter is configured to negotiate a variable transmission rate.

4. The apparatus of claim 1, wherein the COFDM encoder is configured to insert at least one pilot tone into the data channels.

5. The apparatus of claim 1, further comprising a wireless antenna module configured to transmit data to a cellular network.

6. The apparatus of claim 1, further comprising an Ethernet IP switch configured to receive at least one Ethernet signal and configured to communicate at least one IP packet to the ATM SAR.

7. An apparatus comprising:
    a converter for changing network data into asynchronous transfer mode (ATM) data for cellular transmission as a digital subscriber line signal and for reconstructing network data from a cellular reception of a digital subscriber line signal; and
    a transceiver for transmitting the asynchronous transfer data from the converter as the digital subscriber line signal and receiving data from the cellular network for reconstruction into network data by the converter,
    wherein the converter includes an asynchronous transfer mode segmentation and reassembly (ATM SAR) module for segmenting and reassembling data frames, and for bidirectionally communicating a digital signal between a packet network and an ATM network; and the transceiver including a receiver for receiving and processing the data signal, and for transmitting at least one signal from the ATM SAR module, the receiver being configured to receive ATM cells at a variable rate, the receiver having a coded orthogonal frequency division multiplexing (COFDM) decoder for demultiplexing and decoding at least one data channel into a plurality of ATM cells.

8. The apparatus of claim 7, wherein the ATM SAR module is configured to receive ATM cells and reassembled the ATM cells into Internet Protocol (IP) packets.

9. The apparatus of claim 7, wherein the receiver is configured to negotiate a variable transmission rate.

10. The apparatus of claim 7, wherein the COFDM decoder is configured to remove at least one pilot tone from the data channels and correct the data channels based on the at least one pilot tone.

11. The apparatus of claim 7, further comprising a wireless antenna configured to receive data from a cellular network.

12. The apparatus of claim 7, further comprising an Ethernet IP switch configured to receive at least one IP packet from the ATM SAR and configured to transmit at least one IP packet.

* * * * *